Patented Dec. 8, 1931

1,835,926

UNITED STATES PATENT OFFICE

HEINRICH BERNHARD AND FRIEDRICH FELIX, OF BASEL, SWITZERLAND, ASSIGNORS TO SOCIETY OF CHEMICAL INDUSTRY IN BASLE, OF BASEL, SWITZERLAND

MANUFACTURE OF DYESTUFF PREPARATIONS AND THEIR APPLICATION IN THE PRINTING OF TEXTILES

No Drawing. Application filed August 31, 1929, Serial No. 389,870, and in Switzerland September 13, 1928.

The present invention relates to the manufacture of dyestuff preparations and the composition of printing pastes. It comprises the manufacture of these preparations and the composition of these printing pastes, as well as their application in the textile industry.

A known process of printing vat-dyestuffs consists in mixing the dyestuff paste with a suitable thickening having an alkaline reaction and printing the paste, in reduced or unreduced form, on a textile material. Generally sodium carbonate, potassium carbonate, sodium hydroxide or the like is used as the alkaline agent and according to the conditions there may be used as reducing agent an alkali hydrosulfite or an alkali aldehyde sulfoxylate. The usual thickening agents are British gum, dry gum, starch, vegetable mucilage or the like. To the paste there is usually added as an assistant glycerine or one of its substitutes. The printed textile is then steamed in the absence of air; the colour is then developed by oxidation, the material is washed and the shade is developed by a boiling soap solution.

The productiveness of the printing colours thus obtainable varies according to the nature of the vat-dyestuff and can be improved, as is known, by increasing the proportion of glycerine. This expedient, however, has disadvantages; for example, the prints absorb moisture before and after steaming and in consequence will mark off.

This invention is based on the observation that the productiveness of the printing colours is considerably improved if the printing color contains a proportion of urea. The invention is of particular importance in the case of those dyestuffs which otherwise are completely fixed only by a relatively high proportion of glycerine.

The printing pastes obtainable in accordance with the invention are applied in the usual manner, that is to say the material is printed, dried, steamed, washed, soaped and finished.

Instead of stirring urea into the printing color solid preparations may also be obtained by mixing the finely dispersed dyestuff paste with products which are at the same time dispersing agents and protective colloids, such as sulfite cellulose waste liquor, sulfonation products of the distillation residues of benzaldehyde, benzylsulfanilic acid, condensation products from naphthalene sulfonic acids and formaldehyde, etc., and urea, and then drying the product thus obtained, if necessary with addition of a suitable wetting agent, such as inter alia propylated or butylated naphthalene sulfonic acids or other products having a similar action.

The following examples illustrate the invention:—

*Example 1*

A printing color is prepared from
  100 grams Cibanone Orange 6R paste
    (cf. The Dyer and Calico Printer, 1925, No. 629, page 128, right-hand column, line 34)
  650 grams potash thickening
  50–100 grams urea.
  50–100 grams sodium - formaldehyde-sulfoxylate, solution 1/1
  50–100 grams water.

The printing paste is applied to the textile material in the usual manner, brilliant orange prints being produced; if the urea be omitted only very weak prints are obtained.

The potash thickening used in this example is prepared in the following manner:—
  100 grams maize starch
  200 grams of water
  250 grams of British gum (dry) and
  100 grams of glycerine
are boiled together and there are then added
  150 grams of potassium carbonate dissolved in
  200 grams of water.

In preparing the printing paste the urea is dissolved in the potash thickening, advantageously whilst gently warming, whereupon the dyestuff and the hydrosulfite solution are added.

Similar results are obtained by using another alkali instead of potassium carbonate, for example sodium carbonate or sodium hydroxide or another thickening agent or reducing agent (for example sodium hydrosulfite). The invention is also applicable to the production of printing pastes from other vat-dyestuffs, for example Cibanone Red G, (cf. The Dyer and Calico Printer, 1925, No. 629, page 128, right-hand column, line 34), Cibanone Blue GCD (cf. Colour Index No. 1115), Ciba Blue 2BD (cf. Schultz No. 901), Algol Olive R (cf. Färberzeitung 1911, page 384, left-hand column, line 17 from bottom), Indanthrene Printing Black B (cf. Deutscher Färber-Kalender, 1914, page 311), Helindone Golden Orange JG (cf. Deutscher Färber-Kalender, 1922, page 146), and other vat-dyestuffs of various classes.

*Example 2*

500 parts of Cibanone Orange 6R (cf. Example 1 above) are finely triturated with 1650 parts of urea, 290 parts of dry sulfite cellulose waste liquor and 5 parts of a suitable wetting agent, such for example as alkylated β-naphthalene sulfonic acids, dissolved in 2000 parts of water.

The homogeneous dyestuff paste thus obtained is dried in a vacuum. There is thus obtained an easily pulverizable preparation which disperses finely and uniformly in the printing paste.

*Example 3*

83 parts of a press-cake containing 40 parts of Ciba Brown G (cf. Melliands Textilberichte 1928, page 699, right-hand column, line 2 from bottom) are finely triturated with 100 parts of urea, 40 parts of dry sulfite cellulose waste liquor and 0.1 part of the wetting agent from the condensation products mentioned in the preceding example, and 100 parts of water, and the dyestuff paste is dried in a vacuum.

*Example 4*

172 parts of Cibanone Orange 6R (cf. Example 1 above), 250 parts of urea, 400 parts of water, 50 parts of sulfite cellulose waste liquor of 50 per cent. strength, and 10 parts of one of the condensation products named in Example 2 from naphthalene-β-sulfonic acid are finely triturated in a suitable mill. In this manner there is obtained a paste which is excellently suitable for printing textile materials.

*Example 5*

57 parts of Cibanone Orange 6R (cf. Example 1 above) are finely triturated with 40 parts of urea, 9 parts of solid sulfite cellulose waste liquor, and 1 part of a condensation product from naphthalene-β-sulfonic acid. The powder thus obtained can be used with success for the production of prints on textiles.

100 grams of one of the preparations of Examples 2, 3, 4 or 5 are made into a fine paste with 100 grams of tepid water. Then 650 grams of potash thickening are added, and finally 50 grams of sodium-formaldehyde-sulfoxylate dissolved in 50 grams of water. The whole is made up with 50 grams of water to 1000 grams.

This printing paste is applied to the textile material in the usual manner, brilliant, orange or brown prints being produced. If the urea is omitted only very weak prints are obtained.

A printing paste giving the same result may be produced by adding not only sodium-formaldehyde-sulfoxylate but also sodium-hydrosulfite together with sodium-formaldehyde-sulfoxylate, in which case 20 grams of sodium hydroxide solution of 72° Tw. are also added.

Preparations showing a similar favorable effect can also be made with other dyestuffs of the anthraquinone series, such as inter alia Cibanone Yellow 2G (cf. Melliands Textilberichte 1928, page 780, right-hand column, line 11) Cibanone Yellow R (cf. Schultz No. 795), Cibanone Yellow GK (cf. Schultz No. 817), Cibanone Orange R (cf. Schultz No. 792), Cibanone Black B (cf. Schultz No. 765), Cibanone Yellow GN (cf. Schultz No. 849), Cibanone Violet 2R (cf. Schultz No. 767), Cibanone Violet R (cf. Schultz No. 766), Cibanone Dark Blue BO (cf. Schultz No. 763), Cibanone Blue GCD (cf. Schultz No. 842), Cibanone Blue RS (cf. Schultz No. 838), Cibanone Blue 3G (cf. Schultz No. 793), Cibanone Green B (cf. Schultz No. 765), and also with indigoid dyestuffs, such as Ciba Orange G (cf. Schultz No. 911), Ciba Red 3B (cf. Schultz No. 918), Ciba Violet B (cf. Schultz No. 901), Ciba Blue 2G (cf. Schultz No. 882), Ciba Blue 2B (cf. Schultz No. 881), Ciba Blue G (cf. Schultz No. 882).

What we claim is:—

1. The fixing of vat-dyestuffs in the printing of textiles, consisting in steaming the vat-dyestuff on the textiles in presence of a reducing agent and of urea.

2. The fixing of vat-dyestuffs in the printing of cotton, consisting in steaming the vat-dyestuff on the cotton in presence of an alkali aldehyde sulfoxylate and of urea.

In witness whereof we have hereunto signed our names this 21st day of August, 1929.

HEINRICH BERNHARD.
FRIEDRICH FELIX.